United States Patent [11] 3,626,109

[72] Inventors William F. Bartlett
East Rochester;
William A. Oswald; Frank Y. Shaw, both of Rochester, all of N.Y.
[21] Appl. No. 880,157
[22] Filed Nov. 26, 1969
[45] Patented Dec. 7, 1971
[73] Assignee Stromberg-Carlson Corporation
Rochester, N.Y.

[54] CALL-FORWARDING PROCESS

19 Claims, 9 Drawing Figs.

[52] U.S. Cl. .......... 179/18 BE
[51] Int. Cl. .......... H04m 3/54
[50] Field of Search .......... 179/18 BE, 27 FH

[56] References Cited

UNITED STATES PATENTS

| | | | |
|---|---|---|---|
| 3,479,464 | 11/1969 | Sitark .......... | 179/18 BE |
| 3,485,957 | 12/1969 | Pearce .......... | 179/18 BE |
| 3,515,812 | 6/1970 | Hackenberg et al. .......... | 179/18 BE |

*Primary Examiner*—William C. Cooper
*Attorney*—Craig, Antonelli and Hill

ABSTRACT: Call-forwarding process for use with automatic telephone systems wherein a call originally directed to one subscriber is transferred to a second subscriber except for calls from the second subscriber to the one subscriber.

INVENTORS
WILLIAM F. BARTLETT,
WILLIAM A. OSWALD
BY and FRANK Y. SHAW
Craig, Antonelli, Stewart & Hill
ATTORNEYS

MEMORY LAY OUT

CALL FORWARDING / C SECTION

CALL-FORWARDING PROCESS

The present invention relates in general to telephone communication systems, and more particularly, to a process for call-forwarding useful in connection with electronic telephone systems.

With the arrival of more sophisticated electronic switching equipment in automatic telephone exchanges, it has become possible to provide a greater range of special feature services to the subscriber. These classes of service features which have been extended to telephone service subscribers include line lockout, executive right-of-way, add-on conference, toll ticketing and call forwarding. Some of these special features have been available for many years, having been originally provided manually by the telephone operator in response to special instructions from the subscriber. For example, the add-on conference and call-forwarding features could be effected by the telephone operator upon request by special manual switchboard connections.

With the development of automatic telephone systems, the previously provided subscriber services were not only retained, but use of the automatic equipment made possible a greater sophistication and speed of operation in connection with these services. However, the complexity and speed of operation of these services has been limited even with the newly provided electronic switching equipment, since with increase in complexity of the various services comes an increase in the required number of registers and logical components necessary to carry out the process. Accordingly, a greater degree of service with accompanying reduction in the operating time comes only with increased cost and complexity in the required equipment provided for these services.

With the application of data processing techniques to the control of telephone equipment, it has become possible once again to provide improved subscriber services of greater complexity, higher reliability and reduced operating time. Such a stored program system is disclosed for example, in copending application, Ser. No. 880,110, filed Nov. 26, 1969, which is assigned to the same assignee as the present application. Such a system includes a stored program comprising a plurality of instructions which may be executed in accordance with various routines to effect maintenance and control over the operation of the system. The subscriber services which may be provided by such automatic control systems therefore may naturally be of a more sophisticated and complex nature while enjoying the inherent reliability of the system.

It is an object of the present invention to provide a process for call forwarding useful in connection with automatic telephone exchanges, and particularly with stored program data processing control systems.

It is another object of the present invention to provide a process in connection with stored program telephone control systems for completing connections to one subscriber which have been originally directed to another subscriber.

It is a further object of the present invention to provide a process for call forwarding wherein any line within a system can request that all calls destined for that line be automatically forwarded to another specified line of the same system.

It is another object of the present invention to provide a process for call forwarding wherein a transfer of calls from one subscriber automatically to another subscriber may be carried out in an efficient and automatic manner.

It is still another object of the present invention to provide a process for call forwarding wherein the forwardee may override the automatic call-transfer operation to obtain connection with the forwarder.

It is a more specific object of the present invention to provide a process for call forwarding wherein the forwardee may override the call-forwarding feature to establish connection with the forwarder automatically by merely dialing the forwarder's line number.

It is an additional specific feature of the present invention to provide a process for call forwarding wherein the call-forwarding feature may be overridden by the forwardee automatically by dialing a special override code.

In the generally known call-forwarding arrangement for use in electronic telephone systems, the subscriber having the proper class of service is able, by dialing an access code followed by a number, to route all of his incoming calls to the number he has dialed. This operation is carried out in conjunction with a special memory provided in the telephone system which is made accessible upon dialing of the proper access code indicating a call-forwarding class of service. The memory then receives a dialed number in addition to the directory number of the party and stores this information for subsequent use in connection with attempts to communicate with the party having the call-forwarding class of service. In the known arrangement, after the call-forwarding information along with the directory number of the party has been stored in the special memory, each call handled by the electronic telephone system will refer to this memory to determine if the called party has the special call-forwarding class of service and has in fact provided instructions for forwarding the call to another number. However, as can be imagined, the need to access the memory for each call handled by the electronic telephone system to determine if it in fact is subject to special class of service routing requires complicated and expensive control circuitry and places undue requirements upon the memory which is provided for purposes of recording the special class of services information.

The present invention provides a process for call forwarding for use in connection with stored program electronic data processing systems wherein the various functions necessary to effect a transfer of a call automatically from a first subscriber to a second subscriber may be carried on automatically in an efficient and reliable manner.

These and other objects, features and advantages of the present invention will become more apparent from the following detailed description thereof when taken in conjunction with the accompanying drawings, and wherein:

FIG. 1 is a basic block diagram of a stored program data processing telephone control system capable of performing the process in accordance with the present invention;

FIGS. 2*a*, 2*b*, 2*c* and 2*d* are schematic representations of the various memory layouts and registers used in accordance with the present invention;

Figure 1:
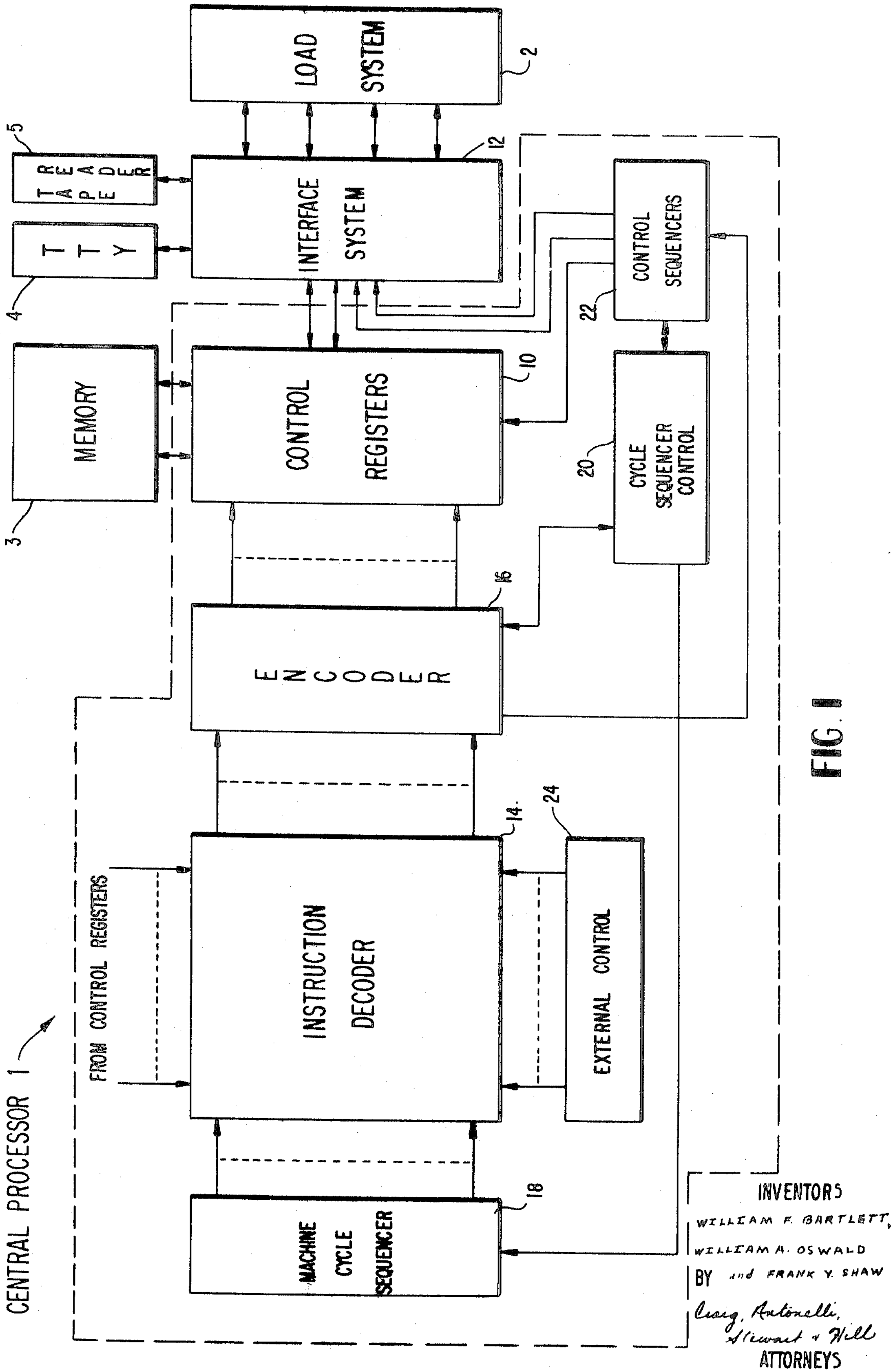

In the basic block diagram as provided in FIG. 1, a central processor 1 operates to provide the necessary control signals for controlling operation of the load system 2 in accordance with the conditions existing in the load system, which are detected and stored in the memory 3, and pursuant to a set of instructions forming one or more programs also stored in the memory 3. The introduction of data into the central processor is accomplished through use of, for example, a teletype unit 4 and a tape reader 5, which permit the introduction or alternation of programs and individual instructions and makes possible the interruption of the operation of the central processor for purposes of introducing special requests for service as required.

The central processor 1 consists of a combination of elements which analyze data received from the load system, determined from the instructions stored in the memory 3 the necessary steps required in view of the analyzed data, determine the sequence of steps to be performed within the selected instruction and generate the necessary control signals for application in control of the load system 2. Data is transferred to the load system 2 by way of a series of control registers 10 a peripheral bus 11 and an interface system 12. The series of control registers 10 provide the means for introducing into or deriving data and instructions from the memory 3 and includes the necessary registers and computing elements for performing analysis on the data derived from the load system 2 and from the memory 3 in accordance with the programs stored in the memory 3 and for generating the necessary control signals which are applied through to the peripheral bus 11 interface system 12 in control of the load system 2.

Operation of the control registers 10 takes two basic forms, that is, an instruction or instructions derived from the memory 3 in coded form indicating the necessary control required for a given set of circumstances must be decoded to a form representing a plurality of individual operative steps through which the various control registers are driven so as to achieve the desired output control to the load system 2 and the proper sequence of the required steps must be determined and the operation of the individual control registers must be regulated in accordance with this predetermined sequence. Accordingly, the central processor 1 includes an instruction decoder 14 which receives a coded instruction from the control registers 1— and decodes this coded instruction by providing a series of outputs representative of a plurality of individual operation cycles which make up the given instruction. These operation cycles in turn consist of a plurality of steps which are determined by an encoder 16 connected to the output of the instruction decoder 14. Outputs representing the individual steps of each cycle forming an instruction are then applied from the encoder 16 to the control registers 10 in control thereof.

The sequence in which the respective steps of each cycle of a given instruction are applied to the control registers 10 is determined by a machine cycle sequencer 18 under control of a cycle sequencer control 20. The machine cycle sequencer 18 determines the sequence of the outputs enabled from the instruction decoder 14 and effectively steps from one cycle to the next cycle in sequence upon indication from the cycle sequencer control 20 that all of the steps of a given cycle have been completed so that the next cycle may be initiated. The cycle sequencer control 20 also controls a plurality of control sequencers 22 in response to control signals received from the encoder 16, the control sequencers 22 providing for controlled operating of the control registers 10 and interface system 12 as required for the various steps of the cycles of a given instruction.

Call forwarding is a feature addition to the basic call-processing capability of a telephone system, which feature allows any line to request that calls destined for that line be forwarded to another line. In the following description the line originating the call-forwarding request will be referred to as the "forwarder" and the line to which the call is forwarded will be referred to as the "forwardee." The process in accordance with the present invention provides that any line within the system can request that all calls destined for that line be automatically forwarded to another specified line; however, no forwarder can be a forwardee, and no forwardee can be a forwarder. This is necessary to inhibit the possibility of tandem forwarded calls resulting in a closed loop, i.e., A forwards to B who forwards to C who forwards to A would result in a closed loop.

Basic steps of the call-forwarding process in accordance with the present invention from a subscriber point of view are as follows. To access the call-forwarding feature the forwarder dials an access code, such as 42. Upon dialing the access code, a second dial tone is returned to the forwarder indicating that the system is ready to receive the number of the subscriber to which calls are to be forwarded. The forwarder now dials the line number of the party to whom he wishes his calls to be forwarded, i.e., the forwardee's line number. Upon completion of the dialing of the forwardee's line number, The forwarder receives verification tone indicating that the number has been received and stored, and the forwarder then hangs up his receiver. At this point, all calls directed to the forwarder will be automatically transferred to the forwardee. Release of the forwarding feature is to be effected only by the original forwarder. To accomplish this, the forwarder dials a release code, such as 47, from the forwarder's station. When the system has received this code, it returns a dial tone to the forwarder indicating that the call forward request has been released or cancelled.

A particularly advantageous feature of the present invention relates to a forwardee override option. In a standard call-forwarding feature, any party attempting to call the forwarder is automatically forwarded to the forwardee. Thus, if the forwardee calls the forwarder, he will automatically receive a busy tone. A novel adaptation of the present invention is the provision that the forwardee and only the forwardee can call the forwarder. The forwardee may call the forwarder by dialing the forwarder's line number, the result of which is the overriding of the call-forwarding feature and establishment of a connection between the forwardee and the forwarder. The present invention also provides for the dialing of an override code, such as 48, by the forwardee if he does not know the forwarder's line number, and the system will automatically establish the forwardee to forwarder line connection. This option is extremely useful in the event that the forwarder has forgotten to release his call-forwarding request, making it possible for the forwardee, by using the option, to contact the forwarder to advise him of this condition.

Figure 2A:
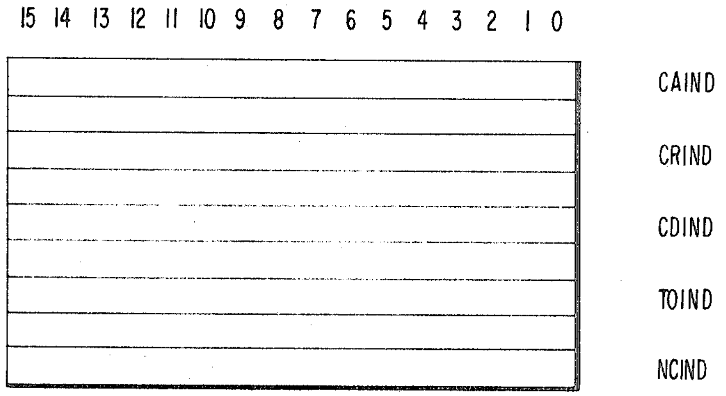

The memory is provided with three major data areas which are utilized for the call-forwarding feature in accordance with the present invention. These include various indicators as provided in FIG. 2*a*, a call-forwarding Queue, as provided in FIG. 2*b*; and processing registers, as provided in FIG. 2*c*.

Five indicators are utilized by the call-forwarding feature, each of the indicators having a 16-bit capacity. The indicator CAIND registers the identity of all processing registers that have received a first digit 4. The second indicator CBIND registers the identity of all processing registers that have received the access code 42. The third indicator CDIND registers the identity of all processing registers that have received the override code 48. The fourth indicator TOIND registers the identity of all registers requiring tone connection. The fifth indicator NCIND registers the identity of all registers requesting a terminating connection.

Figure 2B:
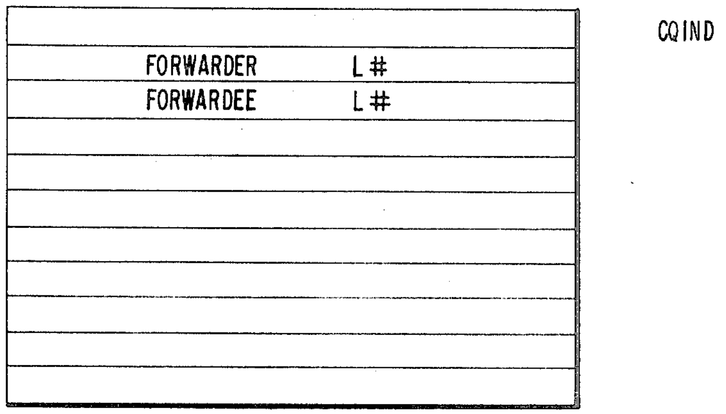

The function of the call-forwarding queue set forth in FIG. 2*b* is to associate the identity of the forwarder and the forwardee. Each call forwarding request utilizes two entries in the queue. The first or even entry contains the forwarder line number and the second or odd entry contains the associated forwardee line number. An indicator CQIND is utilized to indicate the used or unused status of hoppers within the queue. A hopper refers to a double entry containing the forwarder and the forwardee's line number as described above. The size of the queue depends upon the number of simultaneous call-forwarding requests allowed by the system.

Figure 2C:
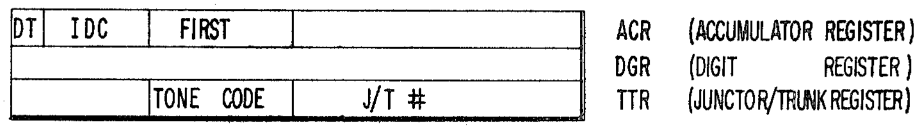

The processing registers are provided to record information relative to the transient status of calls. A typical processing register is shown in FIG. 2*c* and consists of three words described as follows:

ACR Accumulator Register

The ACR contains three sets of information relative to the call-forwarding program. The DT bit indicates if the dial tone is being returned to the party assigned to this register. The IDC portion refers to the incoming digit counter which indicates whether the digit being received is the first, second or any subsequent digit. The FIRST portion of the word refers to a storage location wherein the first digit is stored.

DGR Digit Register

The digit register contains storage locations for digits other than the first digit.

JTR Junctor/Trunk Register

Information contained in JTR which is relevant to the call-forwarding program consists of the tone code and junctor number assigned to the call. The tone code identifies the particular tone to be returned to the calling party. The junctor number identifies the junctor assigned to the call.

Figure 2D:
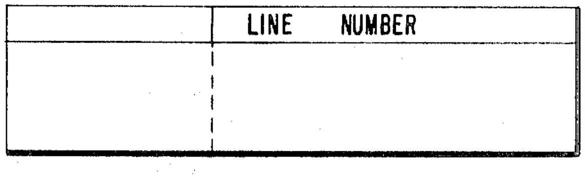

The memory also includes a portion providing an equipment in use table, the format of this table being illustrated in FIG. 2*d*. The line number is the only information contained in the equipment in use table which is relevant to the call-forwarding program. The line number associated with the call is directly asscessed by indexing with the junctor number assigned to the call.

The process providing for call forwarding in accordance with the present invention utilizes the respective indicators, queues, registers and tables provided in the memory along with essential processor equipment to control the subscriber equipment via the peripheral innerface system in accordance with the data received from the subscriber and line conditions detected in the subscriber equipment and stored in the memory. The flow charts illustrated in FIGS. 3 through 6 outline the various steps in accordance with the process of the present invention, it being understood that the respective portions of the process represented by the individual flow charts of the respective Figures are interrelated to provide a single overall process for effecting and controlling the call-forwarding operation.

Figure 3:
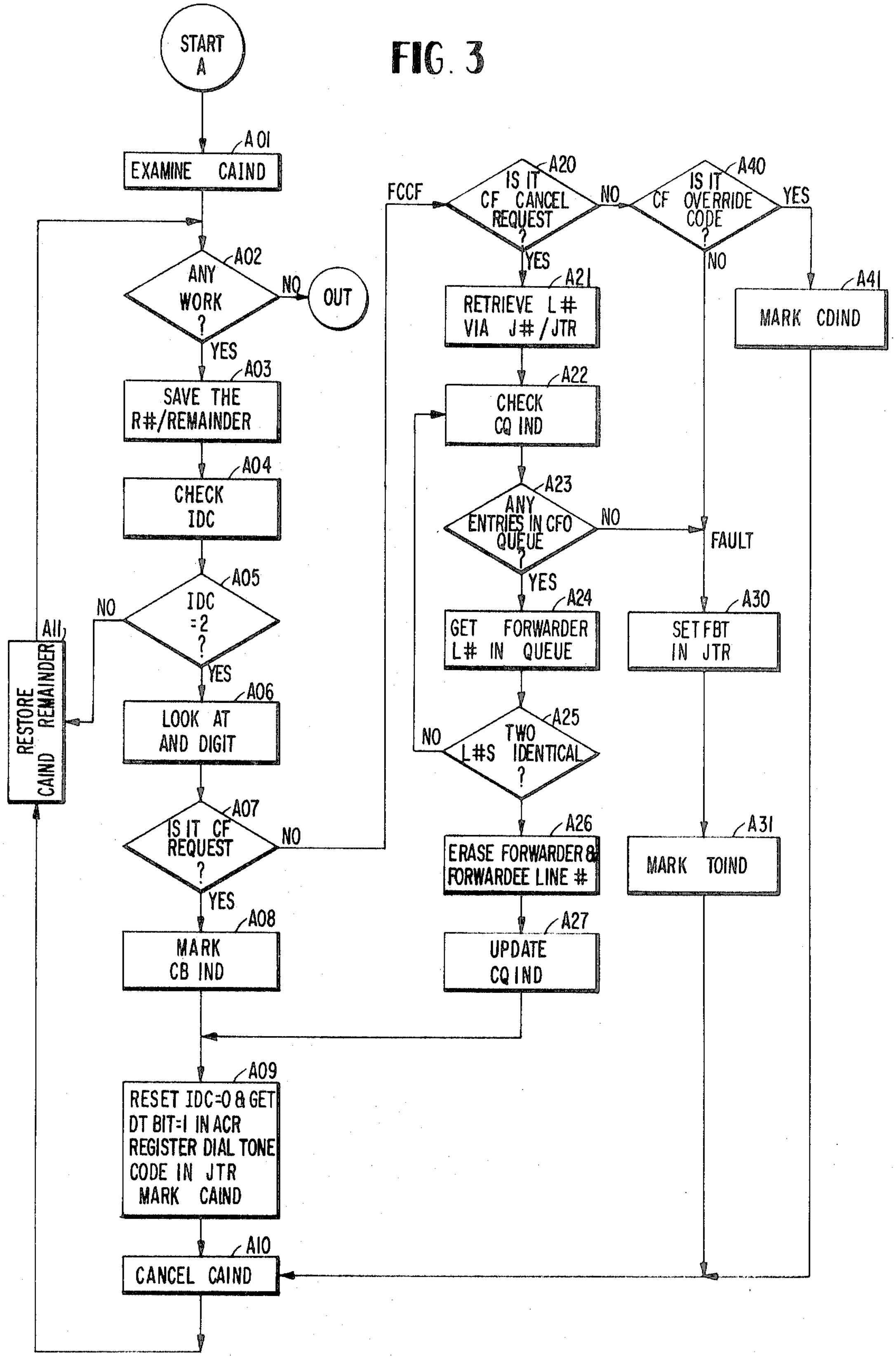
FIG. 3 is a flow chart relating to a portion of the process in accordance with the present invention providing for dialed digit detection and identification.

The portion of the process depicted by the flow chart in FIG. 3 is primarily concerned with the identification of the first two dialed digits. It is objective of this portion of the process to take independent action depending on whether the first two digits received are 42, 47, 48, or 4X (where X is a number other than 2, 7, or 8).

The initial step of the process is to examine the indicator CAIND (AO1) to determine if any processing registers have received a first digit 4. If no processing registers have received a first digit 4, the process concludes at step AO2. However, in the event a first digit 4 has been received, the associated processing register identity will be stored in the indicator CAIND. Upon detection of the register identity in the indicator the contents of the indicator are left intact; however, any remaining registers in the indicator are saved in a scratch area as a remainder. Remainder refers to a modification of the indicator wherein the bit assigned to the associated processing register is zeroed (AO3).

The incoming digit counter IDC in the processing register ACR (FIG. 2*c*) is then checked to determine if the second digit has been received (boxes AO4 and AO5). If the second digit has not been received the remainder in the indicator CAIND is retrieved and a check is made to determine if any other processing registers have received a second digit (A11 and AO2). If the second digit has been received (AO5) a check is made to determine if the second digit is a 2 (AO6 and AO7), and if the second digit is a 2, the indicator CBIND is marked accordingly with the identity of the processing register (AO8). The incoming digit counter IDC and the dial tone bit of the accumulator register ACR (FIG. 2*c*) are set to 0 and 1 respectively, and the dial tone code is placed in the tone code section of the junctor/trunk register JTR. The tone indicator TOIND (FIG. 2*a*) registers the identity of the register requiring tone connection (AO9) and the bit associated with this processing register in indicator CAIND is reset to zero (A10). The CAIND remainder is retrieved (box A11) and the loop proceeds as previously described.

In the event that the second digit received and stored in the digit register DGR (FIG. 2*c*) was not a 2 as determined at step AO7, a check is made to determine if this digit is a 7 at step A20. If the second digit is a 7 indicating receipt of the release code, the originating line number is retrieved from the equipment-in-use table (FIG. 2*d*) by indexing with the junctor number from the JTR register. The indicator CQIND in the call-forwarding queue (FIG. 2*b*) is checked to determine if there are any entries in the queue (A22 and A23). If the queue contains entries, then the first forwarder line number in the queue is compared with the originating line number to determine if the two are identical (A24 and A25). If they are not identical, the indicator CQIND is again checked and all other forwarder line numbers, if any, stored in the queue are sequentially compared with the originating line number.

If a forwarder line number in the queue is found to be identical with the originating line number (A25) then the cancelled request is valid and the forwarder and forwardee line numbers are erased from the queue (A26). The indicator CQIND of the queue is updated to reflect the latest queue status and control proceeds as previously described via step AO9. On the other hand, if the loop formed by steps A22 through A25 does not find a forwarder line number in the queue which is identical to the originating line number, a check of the CQIND at step A22 will eventually result in no more entries determined at step A23. This indicates that the cancelled request is invalid, i.e., that the number thought to be cancelled was not stored in the queue. The loop then exits via step A23. The fast busy tone code is stored in the JTR register of the processing registers (A30) and the tone indicator TOIND is marked (A31). Thus, busy tone will be returned to the subscriber to infer an invalid cancelled request. Program control continues as previously described via step A10.

In the event that the second dial digit is not a 7 (A20) a check is made to determine if it is an 8 (A40), which would indicate a requested override. If the second digit is an 8, it is recognized as an override code, and the indicator CDIND is marked with the identity of the processing register that has received the override code (A41). Control now takes place as previously described by way of step A10. If the second digit check via step A40 did not recognize an 8, busy tone is returned to the subscriber via steps A30 and A31, as previously described.

It should be noted that if the test performed at step A40 is negative, it actually infers that the second digit is neither a 2, 7, nor 8 and hence the invalidity results in the subscriber being returned a busy tone.

Figure 4:
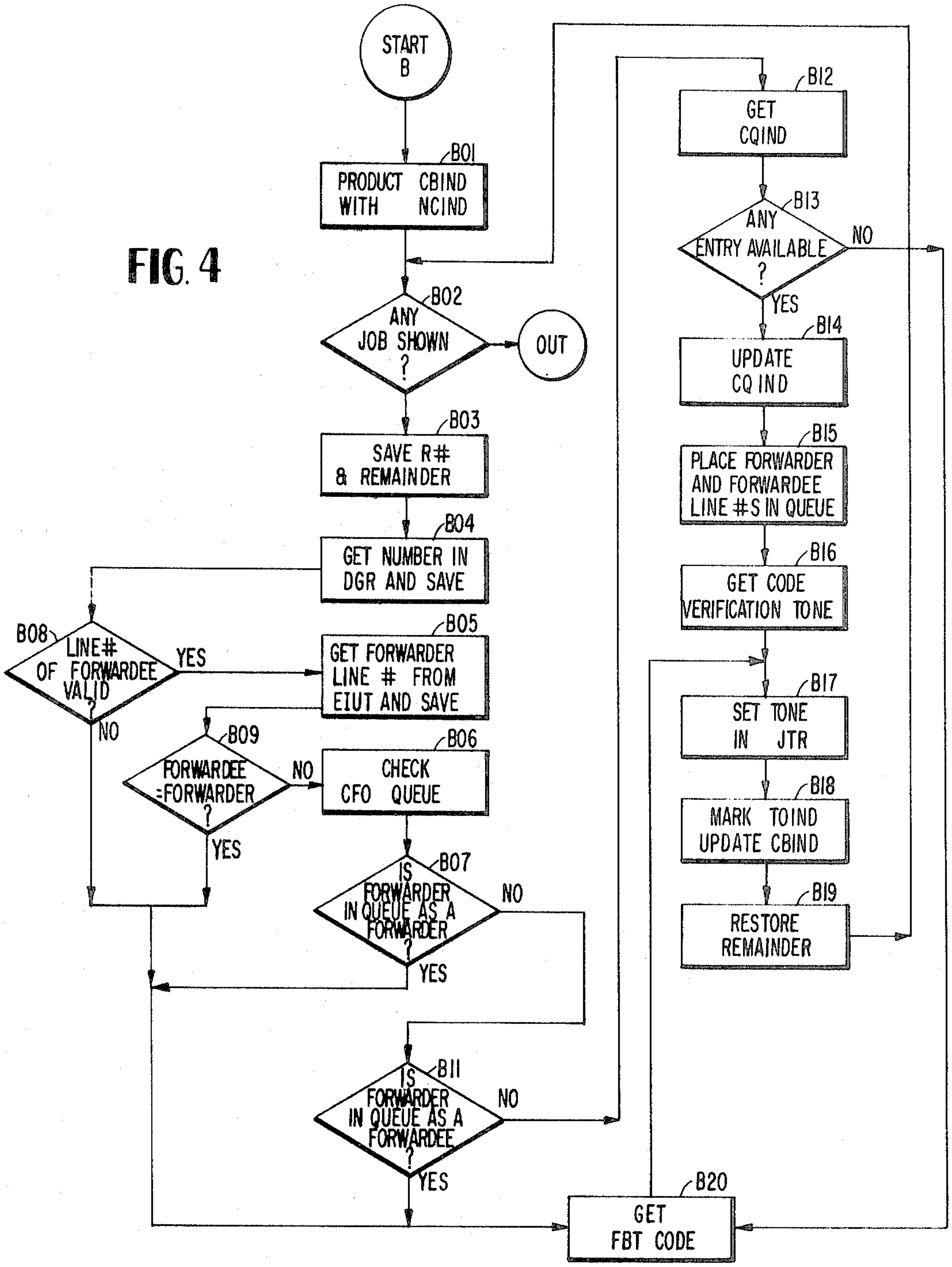
FIG. 4 is a flow chart relating to another portion of the process in accordance with the present invention wherein the storage of data for effecting the call-forwarding operation is effected.

If it is detected at step AO7 in FIG. 3 that a call-forwarding request has been made by a subscriber and the indicator CBIND receives the designation of the processing register that has received the access code 42, the second stage of the process as depicted by the flow chart of FIG. 4 is then carried out. This portion of the process checks the validity of the parties assigned to the call-forwarding request. First, it is determined if the line number of the forwardee is valid. The call-forwarding feature applies only to internal calls within the systems so that no trunks have access to this feature. In addition, as indicated previously, no forwarder can be a forwardee to prevent the possibility of tandem forwarded calls resulting in a closed loop. Thus the validity of the line number of the designated forwardee must be checked.

There must also be a check to determine whether the forwarder number is the same as the forwardee number. Obviously, call forwarding cannot be carried out if the forwarder and forwardee numbers are identical.

A final check determines whether the forwarder is already in the queue as either a forwarder or a forwardee number. This again is provided to prevent the possibility of tandem forwarded calls resulting in a closed loop. If the result of all checks is affirmative, i.e., all of the conditions for completing a call-forwarding arrangement are satisfied, the forwarder and forwardee line numbers are placed in the call-forwarding queue and verification tone is returned to the forwarder. Any negative check result causes busy tone to be returned to the forwarder.

Looking now to FIG. 4 more particularly, the first step of this portion of the process, the register designation which has been stored in the indicators CBIND and the contents of the indicator NCIND which stores the identity of all registers requesting a terminating connection are compared to produce a logical product. If a specific processing register bit is marked in both the CBIND and NCIND, the resulting product will indicate that the register has received the access code 42 and the subsequent 4 digit forwardee line number (BO1 and BO2). If the product shows no register to be in this state, this portion of the process is terminated via step BO2. If a register has received the 42XXXX digits then the register identity and product remainder are stored in the step BO3. The product remainder refers to a modification of the product of CBIND with NCIND where the bit assigned to the associated processing register is zeroed. The forwardee's line number is now obtained from the digit register DGR (FIG. 2*c*) and a check is made to determine the validity of the number. The contents of the register DGR are temporarily stored for this purpose (BO4 and BO8).

If the forwardee's line number is invalid (BO8) the fast busy tone FBT code is put in the tone code section of the JTR register (B20 and B17). The tone indicator TOIND is then provided with the identity of the register and the indicator CBIND is updated (18 and 19). The product the is retrieved and control takes place as previously described via step BO2.

If the forwardee's line number is valid (BO8) then the forwarder's line number is obtained from the equipment-in-use table (FIG. 2*d*) by indexing with the junctor number from the JTR register. The forwarder's line number is temporarily stored (BO5) and a check is made to determine if the forwarder line number is the same as the forwardee line number (BO9). If the two numbers are identical, the forwarder is attempting to call forward to himself and the request is considered invalid. Fast busy tone is returned to the subscriber and control restored as previously described via steps B20, B17, B18, B19, and BO2.

In the event the forwarder and forwardee line numbers do not compare (BO9) the forwarder's line number is then compared with all forwarder and forwardee line numbers stored in the call-forwarding queue (BO6, BO7, and B11). If the forwarder's line number is already contained in the queue than the request is considered invalid and fast busy tone is returned to the forwarder and control proceeds as previously described via step B20. If the forwarder's line is not already contained in the call-forwarding queue, then the indicator CQIND of the queue is interrogated to determine if the queue is full (B12 and B13). If the queue is full, busy tone is returned to the forwarder and control restored as previously described via step B20. If a call-forwarding queue entry is available, then the indicator CQIND is updated and the forwarder and forwardee line numbers are entered in the queue (B14 and B15). The verification tone code is then put into the tone code section of the JTR register (B16 and B17) the tone indicator is marked, the indicator CBIND is updated (B17 and B18), the product remainder is retrieved (B19) and control continues as previously described via step BO2.

Figure 5:
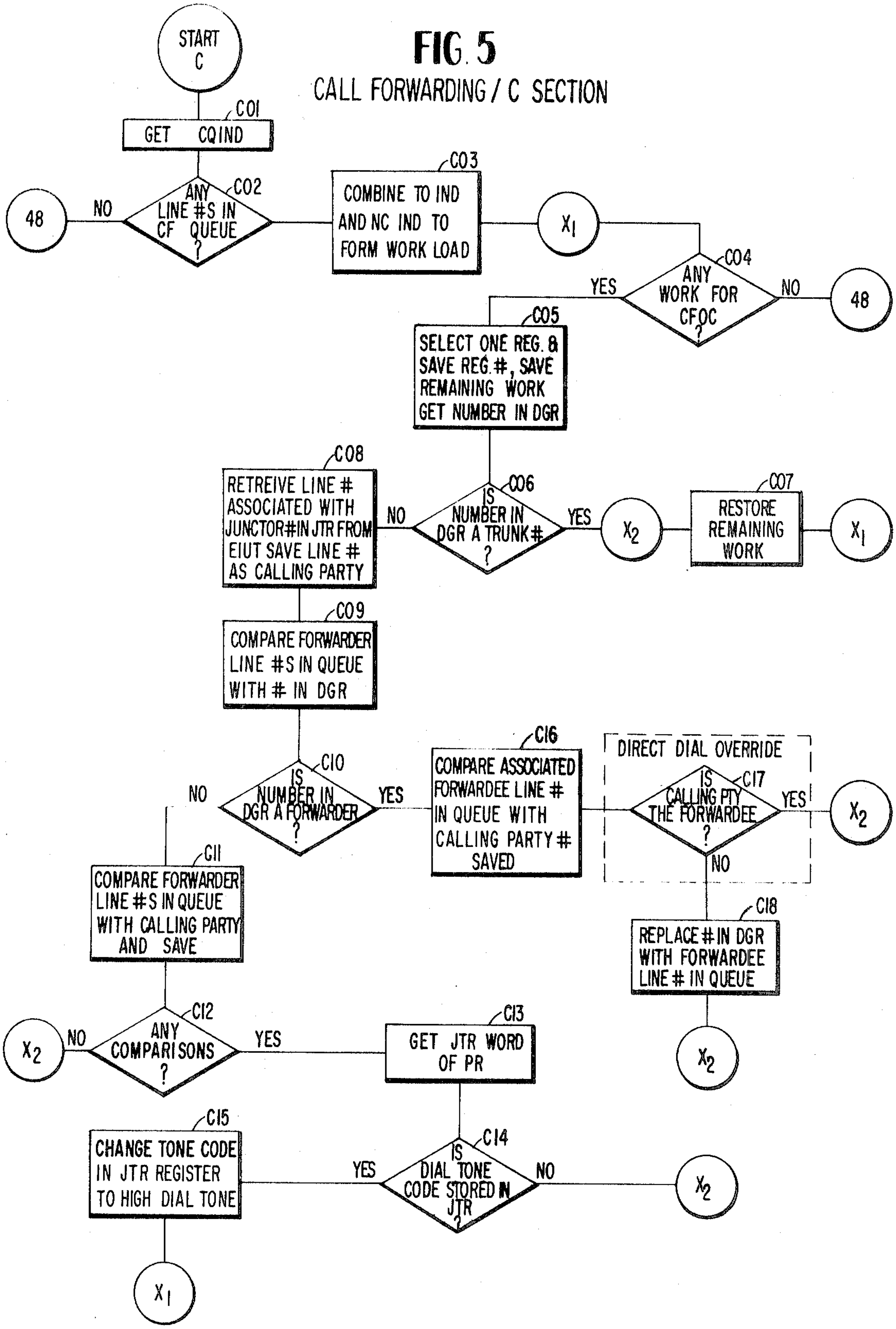
FIG. 5 is a flow chart relating to another portion of the present invention including the automatic override function.

Prior to network connections all calls are processed in accordance with the steps depicted by the flow chart of FIG. 5. Initially the call-forwarding queue indicator CQIND is checked to determine if there are any entries in the queue (CO1). If there are no entries then this portion of the process is extended to the next phase of the process set forth in connection with FIG. 6. However, if entries do exist in the queue, the indicators TOIND and NCIND are logically OR'ed to specify the work load (CO3). An absence of marks in the indicators TOIND and NCIND indicates that no work exists and this portion of the process again branches to the procedure depicted in connection with FIG. 6 via step CO4. The presence of a mark or marks in the indicators TOIND or NCIND is an indication that work must be performed by this portion of the process. The first register identity is obtained and stored and the work load remainder is also stored (CO5). The work load remainder refers to a modification of the logical OR of TOIND and NCIND wherein the bit assigned to the associated processing register is zeroed.

The dialed number existing in the DGR is checked to determine if the number is a trunk number (CO5). If the number is a trunk number (CO6) the call is not associated with the call-forwarding feature, the work load remainder is retrieved and control proceeds as previously described via box CO7. If the number obtained from the digit register DGR is not a trunk (CO6) the originating or calling party line number is obtained from the equipment-in-use table (FIG. 2*d*) by the procedure as previously described (CO8). This originating line number is temporarily stored and the line number stored in the digit register DGR is compared with all forwarder line numbers contained in the call-forwarding queue (CO9). If there is no comparison (C10) then it is established that the call being processed is not destined to be forwarded. The next step of the process is to determine if the originating party is a previously established forwarder in order to return special high dial tone (C11 through C15). The reason for this special high dial tone is to remind forwarders that they have previously established a call-forwarding request. At step C11 there is a comparison between the originating party number with all forwarder line numbers in the queue. If there is no comparison (C12) the work load remainder is retrieved and control proceeds as previously described via step CO7. On the other hand, if there is a comparison (C12), the tone code section of the JTR register is examined to determine if the dial tone code is stored (C13 and C14). If the dial tone code is not stored, control is resumed via step CO7 as previously described. In the event that the dial tone code is stored in the JTR register, then the tone code is changed to a high dial tone (C15) and control then resumes as previously described via step CO7.

If the line number in the digit register DGR is a forwarder line number (C10), a comparison is made to determine if the originating party is the associated forwardee (C16 and C17). If the originating party is the associated forwardee, a direct dial override takes place. In this event a forwardee has called his associated forwarder and a network connection between these two parties is valid and must be established. Control proceeds as previously described via step CO7. If the originating party number is not the associated forwardee (C17) then the existing number in the digit register DGR is replaced with the forwardee line number in the call-forwarding queue (C18). In this event call forwarding takes place and a network connection is established between the originating party and the forwardee. Control is now resumed as previously described at step CO7.

Figure 6:
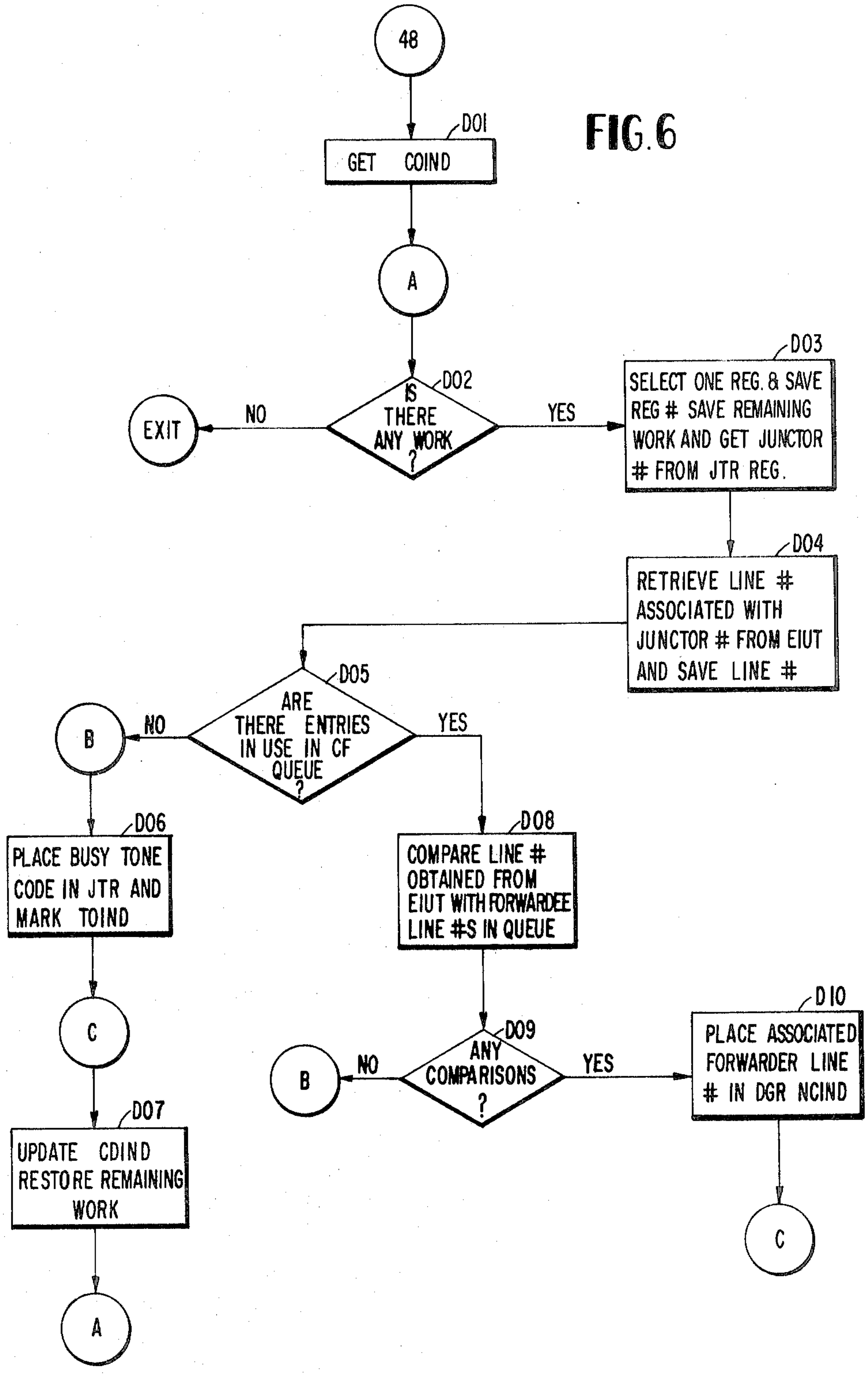
FIG. 6 is a flow chart relating to another feature of the process providing the override function in response to a dialed override code.

The final portion of the process in accordance with the present invention as depicted by the flow chart of FIG. 6 is concerned with the condition wherein the forwardee dials the override code 48 and is connected to the originating forwarder. Initially the indicator CDIND is interrogated to determine if any processing registers have received the override code 48 (DO1 and DO2). A negative interrogation results in a termination of the process at step DO2. If a processing register has received the override code 48 (DO2) then the register identity and the CDIND remainder are stored at step DO3. The CDIND remainder refers to a modification of the data in the CDIND indicator wherein the bit assigned to the associated processing register is zeroed.

The junctor number associated with the call is obtained from the JTR register (DO3). The originating line number is obtained from the equipment in use table (FIG. 2D) and is saved by the previously described process (DO4). The call-forwarding queue is examined to determine if there are any entries (DO5). If there are no entries, the override request is invalid, the busy tone code is stored in the tone code portion of the JTR register (box DO6), the tone indicator TOIND is marked with the identify of the register (box DO6) and the indicator CDIND is updated. The CDIND remainder is interrogated to determine if any more work exists for this section (DO7 and DO2).

If there are entries in the call-forwarding queue (DO5), the originating line number is compared with all forwardee line numbers in the queue (DO8 and DO9). If there is no comparison, then the override request is invalid and control proceeds as previously described via steps DO6, DO7 and DO2. If a comparison is made, the associated forwarder's line number is stored in the digit register DGR and the indicator NCIND is marked (D10). This control results in the originating party (the forwardee entry into the queue) being connected to the associated forwarder. Control now proceeds as previously described via steps DO7 and DO2. Thus, where the forwardee would normally get a busy signal upon attempting to contact the forwarder, the override feature of the present invention permits this call to be established so that neglect on the part of the forwarder to produce a release of the service can be communicated to the forwarder by the forwardee when necessary. Note that this is accomplished automatically when the code 48 is dialed by the forwardee, even though the forwardee does not know the line number of the forwarder.

Thus, the process in accordance with the present invention provides for automatic transfer of a call originally directed to a forwarder subscriber to a forwardee subscriber designated by the forwarder, and additionally makes available in at least two advantageous and convenient ways a call-forwarding override to the forwardee subscriber.

I have shown and described an embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are obvious to one of ordinary skill in the art.

It is claimed:

1. For use in connection with an automatic telephone exchange including memory means for storing data in discrete memory locations, a process for automatically forwarding calls by a calling subscriber originally directed to a forwarder subscriber to a forwardee subscriber, comprising the steps of detecting a first combination of dialed digits representing a request for call forwarding from said forwarder subscriber and the line number of the forwardee subscriber, storing the forwarder and forwardee line numbers in a discrete memory location, comparing all called subscriber line numbers with the forwarder line numbers stored in said memory locations to detect a first coincidence therebetween and comparing the calling subscriber line number to the forwardee line number associated with forwarder line number with which a first coincidence has been detected, to detect a second coincidence indicating that said calling subscriber and said forwardee subscriber are the same, connecting said calling subscriber to said forwardee subscriber upon detection of a first coincidence and not a second coincidence, and connecting said calling subscriber to said forwarder subscriber upon detection of both a first and a second coincidence.

2. A process as defined in claim 1, wherein said detecting step includes scanning all memory locations where dialed digits are store, storing the identity of the memory locations at which a first digit corresponding to the required first digit of said first combination is stored, periodically checking those memory locations whose identity is stored to detect receipt of a second dialed digit, checking the value of the second dialed digit at the stored memory locations to determine if this digit is the same as the second digit required for said first combination, and storing the identity of the memory locations at which a first and a second digit of said first combination is received to indicate a call-forwarding request.

3. A process as defined in claim 1, wherein said step of checking the validity of the forwarder and forwardee line numbers includes comparing the forwarder and the forwardee line numbers to determine whether the numbers are identical, and providing an indication to the forwarder subscriber that the call is improper when the forwarder and forwardee line numbers are identical.

4. A process as defined in claim 3, wherein said step of checking the validity of the forwarder and forwardee line numbers includes scanning the forwarder and forwardee line numbers stored in said discrete memory locations to determine whether the forwarder line number to be checked for validity is already stored as either a forwarder or forwardee, and providing an indication to the forwarder subscriber that the call is improper when the forwarder line number is found in a discrete memory location.

5. A process as defined in claim 1, wherein said comparing steps include comparing the calling subscriber line number to the forwarder line numbers stored in said memory locations to detect a third coincidence indicating that the calling subscriber has already established call forwarding, and providing an indication to the calling subscriber upon detection of a third coincidence that the call is improper.

6. A process as defined in claim 1 including the additional steps detecting a second combination of dialed digits representing a call-forwarding override request, comparing the calling subscriber line number to all forwarder line numbers stored in discrete memory locations to detect a fourth coincidence indicating that the calling subscriber is a forwardee subscriber, obtaining the line number of the forwarder subscriber associated with the forwardee line number effecting the fourth coincidence, and connecting the calling subscriber to the said forwarder subscriber.

7. A process as defined in claim 6, further including the steps subsequent to detection of a second combination checking all discrete memory locations to determine if any line numbers are stored, and providing an indication to the calling subscriber that the call is improper if no line numbers are stored.

8. A process as defined in claim 1, including the additional steps detecting a third combination of dialed digits representing a request for release of call forwarding, comparing the calling subscriber line number to all forwarder line numbers stored in discrete memory locations to detect a fifth coincidence indicating that the calling subscriber is a forwarder subscriber, and erasing the forwarder and forwardee line numbers for the memory location in response to detection of said fifth coincidence.

9. A process for automatically forwarding calls by a calling subscriber originally directed to a forwarder subscriber to a forwardee subscriber in an automatic telephone system wherein the forwarder and forwardee identifications are stored, comprising the steps of first comparing a called subscriber identification dialed by said calling subscriber successively with all forwarder identifications stored to detect a first coincidence of data, then, comparing the calling subscriber identification with the forwardee identification associated with the forwarder identification providing said first coincidence of data to detect a second coincidence of data indicating that said calling subscriber and said forwardee subscriber are the same, connecting said calling subscriber to said forwardee subscriber upon detection of only a first coincidence of data, and connecting said calling subscriber to said forwarder subscriber upon detection of both a first and a second coincidence of data.

10. A process as defined in claim 9, wherein said comparing steps include comparing the calling subscriber line number to the forwarder line numbers stored in said memory locations to detect a third coincidence indicating that the calling subscriber has already established call forwarding, and providing an indication to the calling subscriber upon detection of a third coincidence that the call is improper.

11. A process as defined in claim 9, including the additional steps detecting a second combination of dialed digits representing a call forwarding override request, comparing the calling subscriber line number to all forwardee line numbers stored in discrete memory locations to detect a fourth coincidence indicating that the calling subscriber is a forwardee subscriber, obtaining the line numbers of the forwarder subscriber associated with the forwardee line number effecting the fourth coincidence, and connecting the calling subscriber to the said forwarder subscriber.

12. A process for automatically forwarding calls by a calling subscriber originally directed to a forwarder subscriber to a forwardee subscriber in an automatic telephone system wherein the forwarder and forwardee identifications are stored, comprising the steps of detecting a combination of digits dialed by said calling subscriber representing a call forwarding override request, comparing the calling subscriber identification to all forwardee subscriber identifications stored to detect a coincidence of data indicating that the calling subscriber is a forwardee subscriber, obtaining the identification of the forwarder subscriber associated with the forwardee identification effecting the coincidence of data, and connecting the calling subscriber to the said forwarder subscriber whose identification has been obtained.

13. A process as defined in claim 12, further including the steps subsequent to detection of said combination of digits checking all discrete memory locations to determine if any line numbers are stored, and providing an indication to the calling subscriber that the call is improper if no line numbers are stored.

14. For use in connection with an automatic telephone exchange including memory means for storing data in discrete memory locations, a process for automatically forwarding calls by a calling subscriber originally directed to a forwarder subscriber to a forwarder subscriber, comprising the steps of detecting a first combination of dialed digits representing a request for call forwarding from said forwarder subscriber and the line number of the forwardee subscriber, storing the forwarder and forwardee line numbers in a discrete memory location, comparing all called subscriber line numbers with the forwarder line numbers stored in said memory locations to detect a first coincidence therebetween and comparing the calling subscriber line number to the forwardee line number associated with the forwarder line number with which a first coincidence has been detected, to detect a second coincidence indicating that said calling subscriber and said forwardee subscriber are the same, connecting said calling subscriber to said forwardee subscriber upon detection of a first coincidence and not a second coincidence, connecting said calling subscriber to said forwarder subscriber upon detection of both a first and a second coincidence, detecting a second combination of dialed digits representing a call-forwarding override request, comparing the calling subscriber line number to all forwardee line numbers stored in discrete memory locations to detect a fourth coincidence indicating that the calling subscriber is a forwardee subscriber, obtaining the line number of the forwarder subscriber associated with the forwardee line number effecting the fourth coincidence, and connecting the calling subscriber to the said forwarder subscriber, detecting a third combination of dialed digits representing a request for release of call forwarding, comparing the calling subscriber line number to all forwarder line numbers stored in discrete memory locations to detect a fifth coincidence indicating that the calling subscriber is a forwarder subscriber, and erasing the forwarder and forwardee line numbers for the memory location in response to detection of said fifth coincidence.

15. A process as defined in claim 14 wherein said step of detecting a first combination includes scanning all memory locations where dialed digits are stored, storing the identity of the memory locations at which a first digit corresponding to the required first digit of said first combination is stored, periodically checking those memory locations whose identify is stored to detect receipt of a second dialed digit, checking the value of the second dialed digit at the stored memory locations to determine if this digit is the same as the second digit required for said first combination, and storing the identity of the memory locations at which a first and a second digit of said first combination is received to indicate a call-forwarding request.

16. A process as defined in claim 14 wherein said step of checking the validity of the forwarder and forwardee line numbers includes comparing the forwarder and forwardee line numbers to determine whether the numbers are identical, and providing an indication to the forwarder subscriber that the call is improper when the forwarder and forwardee line numbers are identical.

17. A process as defined in claim 16 wherein said step of checking the validity of the forwarder and forwardee line numbers includes scanning the forwarder and forwardee line numbers stored in said discrete memory locations to determine whether the forwarder line number to be checked for validity is already stored as either a forwarder or forwardee, and providing an indication to the forwarder subscriber that the call is improper when the forwarder line number is found in a discrete memory location.

18. A process as defined in claim 14 wherein said comparing steps include comparing the calling subscriber line number to the forwarder line numbers stored in said memory locations to detect a third coincidence indicating that the calling subscriber has already established call forwarding, and providing an indication to the calling subscriber upon detection of said third coincidence that the call is improper.

19. A process as defined in claim 14 further including the steps subsequent to detection of said second combination of digits checking all discrete memory locations to determine if any line numbers are stored, and providing an indication to the calling subscriber that the call is improper if no line numbers are stored.

* * * * *